(12) United States Patent
Zhao et al.

(10) Patent No.: US 8,913,019 B2
(45) Date of Patent: Dec. 16, 2014

(54) MULTI-FINGER DETECTION AND COMPONENT RESOLUTION

(75) Inventors: Weidong Zhao, Redmond, WA (US); David A. Stevens, Sammamish, WA (US); Aleksandar Uzelac, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 179 days.

(21) Appl. No.: 13/183,377

(22) Filed: Jul. 14, 2011

(65) Prior Publication Data

US 2013/0016045 A1 Jan. 17, 2013

(51) Int. Cl.
*G06F 3/041* (2006.01)

(52) U.S. Cl.
CPC .... *G06F 3/0416* (2013.01); *G06F 2203/04104* (2013.01)
USPC ........................................ 345/173

(58) Field of Classification Search
None
See application file for complete search history.

(56) References Cited

U.S. PATENT DOCUMENTS

| | | | |
|---|---|---|---|
| 4,421,997 A | 12/1983 | Forys | |
| 5,493,294 A | 2/1996 | Morita | |
| 5,825,352 A * | 10/1998 | Bisset et al. | 345/173 |
| 5,856,822 A | 1/1999 | Du et al. | |
| 5,943,043 A | 8/1999 | Furuhata et al. | |
| 6,008,636 A | 12/1999 | Miller et al. | |
| 6,091,406 A | 7/2000 | Kambara et al. | |
| 6,323,846 B1 | 11/2001 | Westerman et al. | |
| 6,671,406 B1 | 12/2003 | Anderson | |
| 6,741,237 B1 | 5/2004 | Benard et al. | |
| 6,856,259 B1 | 2/2005 | Sharp | |
| 6,977,646 B1 | 12/2005 | Hauck et al. | |
| 7,053,887 B2 | 5/2006 | Kraus et al. | |
| 7,174,649 B1 | 2/2007 | Harris | |
| 7,254,775 B2 | 8/2007 | Geaghan et al. | |
| 7,295,191 B2 | 11/2007 | Kraus et al. | |
| 7,362,313 B2 | 4/2008 | Geaghan et al. | |
| 7,375,454 B2 | 5/2008 | Takasaki | |
| 7,489,303 B1 | 2/2009 | Pryor | |
| 7,580,556 B2 | 8/2009 | Lee et al. | |

(Continued)

FOREIGN PATENT DOCUMENTS

| | | |
|---|---|---|
| CN | 1761932 | 4/2006 |
| CN | 1942853 | 4/2007 |

(Continued)

OTHER PUBLICATIONS

"PCT Search Report and Written Opinion", Application No. PCT/US2012/027642, (Sep. 3, 2012), 9 pages.

(Continued)

*Primary Examiner* — Christopher R Lamb
(74) *Attorney, Agent, or Firm* — Tony Azure; Andrew Sanders; Micky Minhas

(57) ABSTRACT

In embodiments of multi-finger detection and component resolution, touch input sensor data is recognized as a component of a multi-finger gesture on a touch-screen display. An ellipse is determined that approximately encompasses the component, and the ellipse has a primary axis and a secondary axis that are orthogonal. A distribution is then generated that projects sensor data elements from the primary axis based on detected intensity of the touch input sensor data. A histogram function can then be generated based on the distribution, where the histogram function indicates individual contacts of the component and separation of the individual contacts.

20 Claims, 6 Drawing Sheets

(56) References Cited

U.S. PATENT DOCUMENTS

| | | |
|---|---|---|
| 7,592,999 B2 | 9/2009 | Rosenberg et al. |
| 7,619,618 B2 | 11/2009 | Westerman et al. |
| 7,711,450 B2 | 5/2010 | Im et al. |
| 7,725,014 B2 | 5/2010 | Lam et al. |
| 7,728,821 B2 | 6/2010 | Hillis et al. |
| 7,746,325 B2 | 6/2010 | Roberts |
| 7,797,115 B2 | 9/2010 | Tasher et al. |
| 7,812,828 B2 | 10/2010 | Westerman et al. |
| 7,907,750 B2 | 3/2011 | Ariyur et al. |
| 7,938,009 B2 | 5/2011 | Grant et al. |
| 7,978,182 B2 | 7/2011 | Ording et al. |
| 8,061,223 B2 | 11/2011 | Pan |
| 8,217,909 B2 | 7/2012 | Young |
| 8,314,780 B2 | 11/2012 | Lin et al. |
| 8,493,355 B2 | 7/2013 | Geaghan et al. |
| 8,725,443 B2 | 5/2014 | Uzelac et al. |
| 8,773,377 B2 | 7/2014 | Zhao et al. |
| 2003/0164820 A1 | 9/2003 | Kent |
| 2004/0207606 A1 | 10/2004 | Atwood et al. |
| 2005/0012724 A1 | 1/2005 | Kent |
| 2005/0063566 A1 | 3/2005 | Beek et al. |
| 2006/0097991 A1 | 5/2006 | Hotelling et al. |
| 2006/0175485 A1 | 8/2006 | Cramer |
| 2006/0227120 A1 | 10/2006 | Eikman |
| 2007/0081726 A1 | 4/2007 | Westerman et al. |
| 2008/0041639 A1 | 2/2008 | Westerman et al. |
| 2008/0062140 A1 | 3/2008 | Hotelling et al. |
| 2008/0068229 A1 | 3/2008 | Chuang |
| 2008/0150909 A1 | 6/2008 | North et al. |
| 2008/0158185 A1* | 7/2008 | Westerman .................... 345/173 |
| 2008/0180399 A1 | 7/2008 | Cheng |
| 2008/0211778 A1 | 9/2008 | Ording et al. |
| 2008/0211782 A1 | 9/2008 | Geaghan et al. |
| 2008/0252616 A1 | 10/2008 | Chen |
| 2008/0278453 A1 | 11/2008 | Reynolds et al. |
| 2008/0284899 A1 | 11/2008 | Haubmann et al. |
| 2008/0309624 A1 | 12/2008 | Hotelling |
| 2008/0309629 A1 | 12/2008 | Westerman et al. |
| 2009/0009483 A1 | 1/2009 | Hotelling et al. |
| 2009/0046073 A1 | 2/2009 | Pennington et al. |
| 2009/0096753 A1 | 4/2009 | Lim |
| 2009/0141046 A1* | 6/2009 | Rathnam et al. ............... 345/661 |
| 2009/0157206 A1 | 6/2009 | Weinberg et al. |
| 2009/0160763 A1 | 6/2009 | Cauwels et al. |
| 2009/0174679 A1 | 7/2009 | Westerman |
| 2009/0190399 A1 | 7/2009 | Shibata et al. |
| 2009/0225036 A1 | 9/2009 | Wright |
| 2009/0241701 A1 | 10/2009 | Pan |
| 2009/0250268 A1 | 10/2009 | Staton et al. |
| 2009/0251435 A1 | 10/2009 | Westerman et al. |
| 2009/0251436 A1 | 10/2009 | Keskin |
| 2009/0267903 A1* | 10/2009 | Cady et al. .................... 345/173 |
| 2009/0273584 A1 | 11/2009 | Staton et al. |
| 2009/0303202 A1 | 12/2009 | Liu |
| 2009/0312009 A1 | 12/2009 | Fishel |
| 2010/0053099 A1 | 3/2010 | Vincent et al. |
| 2010/0060604 A1 | 3/2010 | Zwart et al. |
| 2010/0073318 A1 | 3/2010 | Hu et al. |
| 2010/0103118 A1 | 4/2010 | Townsend et al. |
| 2010/0103121 A1 | 4/2010 | Kim et al. |
| 2010/0117962 A1 | 5/2010 | Westerman et al. |
| 2010/0134429 A1 | 6/2010 | You et al. |
| 2010/0193258 A1 | 8/2010 | Simmons et al. |
| 2010/0214233 A1 | 8/2010 | Lee |
| 2010/0231508 A1 | 9/2010 | Cruz-Hernandez et al. |
| 2010/0277505 A1 | 11/2010 | Ludden et al. |
| 2010/0302211 A1 | 12/2010 | Huang |
| 2010/0309139 A1 | 12/2010 | Ng |
| 2010/0315266 A1 | 12/2010 | Gunawardana et al. |
| 2010/0315366 A1 | 12/2010 | Lee et al. |
| 2010/0315372 A1 | 12/2010 | Ng |
| 2011/0001633 A1 | 1/2011 | Lam et al. |
| 2011/0018822 A1 | 1/2011 | Lin et al. |
| 2011/0025629 A1 | 2/2011 | Grivna et al. |
| 2011/0042126 A1 | 2/2011 | Spaid et al. |
| 2011/0050620 A1 | 3/2011 | Hristov |
| 2011/0080348 A1 | 4/2011 | Lin et al. |
| 2011/0084929 A1 | 4/2011 | Chang et al. |
| 2011/0106477 A1 | 5/2011 | Brunner |
| 2011/0115709 A1 | 5/2011 | Cruz-Hernandez |
| 2011/0115747 A1 | 5/2011 | Powell et al. |
| 2011/0141054 A1 | 6/2011 | Wu |
| 2011/0242001 A1 | 10/2011 | Zhang et al. |
| 2011/0248941 A1 | 10/2011 | Abdo et al. |
| 2011/0261005 A1 | 10/2011 | Joharapurkar et al. |
| 2011/0267481 A1 | 11/2011 | Kagei |
| 2011/0298709 A1 | 12/2011 | Vaganov |
| 2011/0298745 A1* | 12/2011 | Souchkov .................... 345/174 |
| 2011/0299734 A1 | 12/2011 | Bodenmueller |
| 2011/0304577 A1 | 12/2011 | Brown |
| 2011/0304590 A1 | 12/2011 | Su et al. |
| 2012/0030624 A1 | 2/2012 | Migos |
| 2012/0032891 A1 | 2/2012 | Parivar |
| 2012/0065779 A1 | 3/2012 | Yamaguchi et al. |
| 2012/0065780 A1 | 3/2012 | Yamaguchi et al. |
| 2012/0068957 A1 | 3/2012 | Puskarich et al. |
| 2012/0075331 A1 | 3/2012 | Mallick |
| 2012/0105334 A1 | 5/2012 | Aumiller et al. |
| 2012/0131490 A1* | 5/2012 | Lin et al. ....................... 715/773 |
| 2012/0146956 A1 | 6/2012 | Jenkinson |
| 2012/0153652 A1 | 6/2012 | Yamaguchi et al. |
| 2012/0187956 A1 | 7/2012 | Uzelac |
| 2012/0188176 A1 | 7/2012 | Uzelac |
| 2012/0188197 A1 | 7/2012 | Uzelac |
| 2012/0191394 A1 | 7/2012 | Uzelac |
| 2012/0206377 A1 | 8/2012 | Zhao |
| 2012/0206380 A1 | 8/2012 | Zhao |
| 2012/0223894 A1 | 9/2012 | Zhao |
| 2012/0268416 A1 | 10/2012 | Pirogov et al. |
| 2012/0280934 A1 | 11/2012 | Ha et al. |
| 2012/0280946 A1 | 11/2012 | Shih et al. |
| 2012/0301009 A1 | 11/2012 | Dabic |
| 2012/0319992 A1 | 12/2012 | Lee |
| 2013/0063167 A1 | 3/2013 | Jonsson |
| 2013/0113751 A1 | 5/2013 | Uzelac |
| 2013/0197862 A1 | 8/2013 | Uzelac et al. |
| 2013/0238129 A1 | 9/2013 | Rose et al. |
| 2013/0345864 A1 | 12/2013 | Park |
| 2014/0081793 A1 | 3/2014 | Hoffberg |

FOREIGN PATENT DOCUMENTS

| | | |
|---|---|---|
| CN | 200947594 | 9/2007 |
| CN | 101553777 | 10/2009 |
| CN | 101661373 | 3/2010 |
| CN | 101937296 | 1/2011 |
| CN | 201828476 | 5/2011 |
| CN | 2201903594 | 7/2011 |
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2077490 | 7/2009 |
| EP | 2284654 | 2/2011 |
| JP | 2003303051 | 10/2003 |
| JP | 2007323731 | 12/2007 |
| KR | 20050003155 | 1/2005 |
| KR | 20050094359 | 9/2005 |
| KR | 100763057 | 10/2007 |
| KR | 20080066416 | 7/2008 |
| KR | 100941441 | 2/2010 |
| KR | 1020100067178 A | 6/2010 |
| KR | 20100077298 | 7/2010 |
| KR | 1020100129015 A | 12/2010 |
| KR | 101007049 | 1/2011 |
| KR | 20110011337 | 2/2011 |
| KR | 101065014 | 9/2011 |
| WO | WO-9938149 | 7/1999 |
| WO | WO-2005114369 | 12/2005 |

(56) References Cited

FOREIGN PATENT DOCUMENTS

| | | |
|---|---|---|
| WO | WO-2006042309 | 4/2006 |
| WO | WO-2010073329 | 7/2010 |
| WO | WO-2013063042 | 5/2013 |

OTHER PUBLICATIONS

"PCT Search Report and Written Opinion", Application No. PCT/US2012/024780, (Sep. 3, 2012), 9 pages.

"PCT Search Report and Written Opinion", Application No. PCT/US2012/024781, (Sep. 3, 2012), 9 pages.

"Final Office Action", U.S. Appl. No. 12/941,693, (Nov. 26, 2012), 22 Pages.

"Non-Final Office Action", U.S. Appl. No. 13/152,991, (Mar. 21, 2013), 10 pages.

"International Search Report", Mailed Date: Jun. 13, 2012, Application No. PCT/US2011/055621, Filed Date: Oct. 10, 2011, pp. 8.

"International Search Report", Application No. PCT/US2011/058855, (Nov. 1, 2011), 8 pages.

"Non-Final Office Action", U.S. Appl. No. 12/941,693, (Jul. 18, 2012), 19 pages.

Baraldi, Stefano et al., "WikiTable: Finger Driven Interaction for Collaborative Knowledge-Building Workspaces", *Proceedings of the 2006 Conference on Computer Vision and Pattern Recognition Workshop (CVPRW '06)*, available at <<http://ieeexplore.ieee.org/stamp/stamp.jsp?tp=&arnumber=1640590>>,(Jul. 5, 2006),6 pages.

Benko, Hrvoje et al., "Resolving Merged Touch Contacts", U.S. Appl. No. 12/914,693, (Nov. 8, 2010),22 pages.

Binns, Francis S., "Multi-"Touch" Interaction via Visual Tracking", *Bachelor of Science in Computer Science with Honours, The University of Bath*, available at <<http://www.cs.bath.ac.uk/~mdv/courses/CM30082/projects.bho/2008-9/Binns-FS-dissertation-2008-9.pdf>>,(May 2009),81 pages.

Cao, Xiang et al., "Evaluation of an On-line Adaptive Gesture Interface with Command Prediction", *In Proceedings of GI 2005*, Available at <http://citeseerx.ist.psu.edu/viewdoc/download:jsessionid=DAB1B08F620C23464427932BAF1ECF49?doi=10.1.1.61.6749&rep=rep1&type=pdf>,(May 2005),8 pages.

Cao, Xiang et al., "ShapeTouch: Leveraging Contact Shape on Interactive Surfaces", *In Proceedings of TABLETOP 2008*, Available at <http://www.cs.toronto.edu/~caox/tabletop2008_shapetouch.pdf>,(2008),pp. 139-146.

Dang, Chi T., et al., "Hand Distinction for Multi-Touch Tabletop Interaction", *University of Augsburg; Institute of Computer Science; Proceedings of the ACM International Conference on Interactive Tabletops and Surfaces*, (Nov. 23-25, 2009),8 pags.

Dillencourt, Michael B., et al., "A General Approach to Connected-Component Labeling for Arbitrary Image Representations", *Journal of the Association for Computing Machinery*, vol. 39, No. 2, available at <<http://www.cs.umd.edu/~hjs/pubs/DillJACM92.pdf>>,(Apr. 1992),pp. 253-280.

Tao, Yufei et al., "An Efficient Cost Model for Optimization of Nearest Neighbor Search in Low and Medium Dimensional Spaces", *Knowledge and Data Engineering*, vol. 16 Issue:10, retrieved from <<http://www.cais.ntu.edu.sg/~jzhang/papers/ecmonns.pdf>> on Mar. 16, 2011,(Oct. 2004),16 pages.

Tsuchiya, Sho et al., "Vib-Touch: Virtual Active Touch Interface for Handheld Devices", *In Proceedings of The 18th IEEE International Symposium on Robot and Human Interactive Communication*, Available at <http://www.mech.nagoya-u.ac.jp/asi/en/member/shogo_okamoto/papers/tsuchiyaROMAN2009.pdf>,(Oct. 20, 2009),pp. 12-17.

Westman, Tapani et al., "Color Segmentation by Hierarchical Connected Components Analysis with Image Enhancement by Symmetric Neighborhood Filter", *Pattern Recognition, 1990. Proceedings., 10th International Conference* on Jun. 16-21, 1990, retrieved from <<http://ieeexplore.ieee.org/stamp/stamp.jsp?tp=&arnumber=118219>> on Mar. 16, 2011,(Jun. 16, 1990),pp. 796-802.

Wilson, Andrew D., "TouchLight: An Imaging Touch Screen and Display for Gesture-Based Interaction", *In Proceedings of ICIM 2004*, Available at <http://citeseerx.ist.psu.edu/viewdoc/download-?doi=10.1.1.95.3647&rep=rep1&type=pdf>, (Oct. 2004),8 pages.

"Actuation Force of Touch Screen" *Solutuons @ Mecmesin*, retrieved from <http://www.ArticleOnePartners.com/index/servefile?fileId=188971>,(Dec. 31, 2010),1 page.

"AO Touch Screen Tester", retrieved from <http://www.ao-cs.com/Projects/touch%20screen%20tester%20project.html>, (Dec. 31, 2010),1 page.

"Capacitive Touch Sensors—Application Fields, Technology Overview and Implementation Example", *Fujitsu Microelectronics Europe GmbH*; retrieved from http://www.fujitsu.com/downloads/MICRO/fme/articles/fujisu-whitepaper-capacitive-touch-sensors.pdf on Jul. 20, 2011, (Jan. 12, 2010), 12 pages.

"Haptic-Actuator Controllers", retrieved from <http://www.maxim-ic.com/products/data_converters/touch-interface/haptic-actuator.cfm> on May 4, 2011, 1 page.

"How to Use the Precision Touch Testing Tool", retrieved from <http://feishare.com/attachments/article/279/precision-touch-testing-tool-Windows8-hardware-certification.pdf>, (Apr. 15, 2012), 10 pages.

"Linearity Testing Solutions in Touch Panels" retrieved from <advantech.com/machine-automation/ .../%7BD05BC586-74DD-4BFA-B81A-2A9F7ED489F/>, (Nov. 15, 2011), 2 pages.

"MAX11871", retrieved from <http://www.maxim-ic.com/datasheet/index.mvp/id/7203> on May 4, 2011, 2 pages.

"MicroNav Integration Guide Version 3.0" retrieved from <http://www.steadlands.com/data/interlink/micronavintguide.pdf>, (Dec. 31, 2003), 11 pages.

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.

"OptoFidelity Touch & Test" retrieved from <http://www.ArticleOnePartners.com/index/servefile?fileId=188969, (Feb. 20, 2012), 2 pages.

"OptoFidelity Touch & Test" retrieved from <http://www.ArticleOnePartners.com/index/servefile?fileId=188420>, (May 4, 2012), 2 pages.

"OptoFidelity Two Fingers -robot" video available at <http://www.youtube.com/watch?v=YppRASbXHfk&feature=player_embedded#!section>, (Sep. 15, 2010), 2 pages.

"Projected Capacitive Test Fixture", retrieved from <http://www.touch-intl.com/downloads/DataSheets%20for%20Web/6500443-PCT-DataSheet-Web.pdf>, (2009), 2 pages.

"Resistive Touch Screen_Resistance Linearity Test", video available at <http://www.youtube.com/watch?v=hb23GpQdXXU>, (Jun. 17, 2008), 2 pages.

"Smartphone Automatic Testing Robot at UEI Booth", video available at <http://www.youtube.com/watch?v=f-Q4ns-b9sA>, (May 9, 2012), 2 pages.

"STM23S-2AN NEMA 23 Integrated Drive+Motor" Retrieved from: <http://www.applied-motion.com/products/integrated-steppers/stm23s-2an> on Jan. 24, 2012, 3 pages.

"Technology Comparison: Surface Acoustic Wave, Optical and Bending Wave Technology", *3M Touch Systems*, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,(2009), pp. 1-4.

"Touch Panel Inspection & Testing Solution", retrieved from <http://www.ArticleOnePartners.com/index/servefile?fileId=188967>, (Dec. 31, 2010),1 page.

"Touch Panel Semi-Auto Handler Model 3810", retrieved from <http://www.chromaus.com/datasheet/3810_en.pdf>, (Dec. 31, 2010), 2 pages.

"TouchSense Systems Immersion", retrieved from <http://www.ArticleOnePartners.com/idex/servefile?fileId=188486>, (Jun. 19, 2010), 20 pages.

"Using Low Power Mode on the MPR083 and MPR084" *Freescale Semiconductor Application Note*, Available at <http://cache.freescale.com/files/sensors/doc/app_note/AN3583.pdf>,(Nov. 2007), pp. 1-5.

(56) References Cited

OTHER PUBLICATIONS

Asif, Muhammad et al., "MPEG-7 Motion Descriptor Extraction for Panning Camera Using Sprite Generated", *In Proceedings of AVSS 2008*, Available at <http://ieeexplore.ieee.org/stamp/stamp.jsp?tp=&arnumber=4730384>,(Sep. 2008), pp. 60-66.

Brodkin, Jon "Windows 8 hardware: Touchscreens, sensor support and robotic fingers", <<http://arstechnica.com/business/news/2011/09/windows-8-hardware-touch-screens-sensor-support-and-robotic-fingers.ars>>, (Sep. 13, 2011),1 Page.

Buffet, Y "Robot Touchscreen Analysis", <<http://ybuffet.posterous.com/labsmotocom-blog-archive-robot-touchscreen-an>>, (Apr. 19, 2010), 2 Pages.

Cravotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011), 3 pages.

Dillow, Clay "Liquid-Filled Robot Finger More Sensitive to Touch Than a Human's", retrieved from <www.popsci.com/technology/article/2012-06/new-robot-finger-more-sensitive-touch-human> on Jul. 27, 2012, (Jun. 19, 2012), 3 pages.

Hoggan, Eve et al., "Mobile Multi-Actuator Tactile Displays", *In 2nd international conference on Haptic and audio interaction design*, retrieved from <http://www.dcs.gla.ac.uk/~stephen/papers/HAID2.pdf>,(Oct. 29, 2007),12 pages.

Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.

Kastelan, et al., "Stimulation Board for Automated Verification of Touchscreen-Based Devices", *22nd International Conference on Field Programmable Logic and Applications*, Available at <https://www2.lirmm.fr/lirmm/interne/BIBLI/CDROM/MIC/2012/FPL_2012/Papers/PHD7.pdf>,(Aug. 29, 2012), 2 pages.

Kastelan, et al., "Touch-Screen Stimulation for Automated Verification of Touchscreen-Based Devices", *In IEEE 19th International Conference and Workshops on Engineering of Computer Based Systems*, (Apr. 11, 2012), pp. 52-55.

Khandkar, Shahedul H., et al., "Tool Support for Testing Complex MultiTouch Gestures" *ITS* 2010, Nov. 7-10, 2010, Saarbrucken, Germany, (Nov. 7, 2010), 10 pages.

Kjellgren, Olof "Developing a remote control application for Windows CE", *Bachelor Thesis performed in Computer Engineering at ABE Robotics, Miilardalen University, Department of Computer Science and Electronics*, Retrieved at <<http://www.idt.mdh.se/utbildning/exjobblfiles/TR0661.pdf>>,(May 30, 2007), 43 Pages.

Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.

Kuosmanen, Hans "Testing the Performance of Touch-Enabled Smartphone User Interfaces", retrieved from <http://www.ArticleOnePartners.com/index/servefile?fileld=188442>, (Dec. 31, 2008), 2 pages.

Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.

McGlaun, Shane "Microsoft's Surface 2.0 Stress Testing Robot Called Patty Shown off for First Time", Retrieved at <<http://www_.slashgear._com/microsofts-surface-2_0-stress-testing-robot_called-patty-shown-off_-for_-first-time-19172971/>>, (Aug. 19, 2011), 1 Page.

McMahan, William et al., "Haptic Display of Realistic Tool Contact via Dynamically Compensated Control of a Dedicated Actuator", *International Conference on Intelligent Robots and Systems*, St. Louis, MO, Oct. 11-15, 2009, retrieved from <http://repository.upenn.edu/meam_papers/222>,(Dec. 15, 2009), 9 pages.

Pratt, Susan "Factors Affecting Sensor Response", *Analog Devices, AN-830 Application Note*, Available at <http://www.analog.com/static/imported-files/application_notes/52957377291382187 42AN830_0.pdf>,(Dec. 2005), pp. 1-8.

Takeuchi, et al., "Development of a Multi-fingered Robot Hand with Softness changeable Skin Mechanism", *International Symposium on and 2010 6th German Conference on Robotics (ROBOTIK)*, Retrieved at <<http://ieeexplore.ieee.org/stamp/stamp.jsp?arnumber=05756853>>,(Jun. 7, 2010), 7 Pages.

Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.

Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.

Wimmer, Raphael et al., "Modular an Deformable Touch-Sensitive Surfaces Based on Time Domain Reflectometry", *In Proceedings of UIST 2011*, Available at <http://www.medien.ifi.lmu.de/pubdb/publications/pub/wimmer2011tdrTouch/wimmer2011tdrTouch.pdf>,(Oct. 2011), 10 pages.

Zivkov, et al., "Touch Screen Mobile Application as Part of Testing and Verification System", *Proceedings of the 35th International Convention*, (May 21, 2012), pp. 892-895.

"Input Testing Tool", U.S. Appl. No. 13/659,777, (Oct. 24, 2012), 45 pages.

"Non-Final Office Action", U.S. Appl. No. 12/941,693, (May 16, 2013), 13 pages.

"Non-Final Office Action", U.S. Appl. No. 13/293,060, (Jul. 12, 2013), 9 pages.

"PCT Search Report and Written Opinion", Application No. PCT/US2013/021787, (May 13, 2013), 9 pages.

"Touch Quality Test Robot", U.S. Appl. No. 13/530,692, (Jun. 22, 2012), 40 pages.

"Final Office Action", U.S. Appl. No. 13/293,060, Sep. 25, 2013, 10 pages.

"Non-Final Office Action", U.S. Appl. No. 13/293,060, Nov. 29, 2013, 11 pages.

"Non-Final Office Action", U.S. Appl. No. 13/156,243, Sep. 19, 2013, 12 pages.

"International Search Report and Written Opinion", Application No. PCT/US2013/046208, Sep. 27, 2013, 12 pages.

"Non-Final Office Action", U.S. Appl. No. 13/099,288, Feb. 6, 2014, 13 pages.

"Non-Final Office Action", U.S. Appl. No. 13/198,036, Jan. 31, 2014, 14 pages.

"Final Office Action", U.S. Appl. No. 13/152,991, Sep. 20, 2013, 14 pages.

"Non-Final Office Action", U.S. Appl. No. 13/154,161, Jan. 3, 2014, 14 pages.

"Non-Final Office Action", U.S. Appl. No. 12/941,693, Nov. 18, 2013, 21 Pages.

"Notice of Allowance", U.S. Appl. No. 13/156,243, Jan. 28, 2014, 8 pages.

"Notice of Allowance", U.S. Appl. No. 13/198,415, Dec. 26, 2013, 8 pages.

"Final Office Action", U.S. Appl. No. 13/154,161, Apr. 22, 2014, 16 pages.

"Final Office Action", U.S. Appl. No. 13/530,692, Apr. 10, 2014, 16 pages.

"Foreign Office Action", CN Application No. 201210018527.8, Feb. 24, 2014, 10 Pages.

"Foreign Office Action", CN Application No. 201210029859.6, Feb. 21, 2014, 15 Pages.

"Foreign Office Action", CN Application No. 201210031164.1, Mar. 5, 2014, 14 Pages.

"International Search Report and Written Opinion", Application No. PCT/US2013/061067, Feb. 7, 2014, 11 pages.

"Non-Final Office Action", U.S. Appl. No. 13/152,991, Mar. 21, 2014, 18 pages.

"Non-Final Office Action", U.S. Appl. No. 13/530,692, Jan. 31, 2014, 14 pages.

"Restriction Requirement", U.S. Appl. No. 13/205,319, May 8, 2014, 6 pages.

"Corrected Notice of Allowance", U.S. Appl. No. 13/156,243, 4 pages.

(56) References Cited

OTHER PUBLICATIONS

"Foreign Office Action", TW Application No. 101100606, Apr. 15, 2014, 10 pages.
"Non-Final Office Action", U.S. Appl. No. 13/099,288, Jun. 10, 2014, 22 pages.
"Extended European Search Report", EP Application No. 11840170.2, Jul. 16, 2014, 10 pages.
"Final Office Action", U.S. Appl. No. 13/152,991, Aug. 20, 2014, 14 pages.
"Final Office Action", U.S. Appl. No. 13/198,036, Aug. 14, 2014, 17 pages.
"Foreign Notice of Allowance", CN Application No. 201110349777.5, May 28, 2014, 6 pages.
"Foreign Office Action", CN Application No. 201210031164.1, Sep. 11, 2014, 9 Pages.
"Non-Final Office Action", U.S. Appl. No. 13/530,692, Aug. 25, 2014, 18 pages.
"Non-Final Office Action", U.S. Appl. No. 13/205,319, Sep. 9, 2014, 13 pages.
"Non-Final Office Action", U.S. Appl. No. 13/293,060, Jul. 23, 2014, 12 pages.
"Notice of Allowance", U.S. Appl. No. 12/941,693, Aug. 13, 2014, 8 pages.
"Notice of Allowance", U.S. Appl. No. 13/362,238, Jul. 28, 2014, 11 pages.
"Supplemental Notice of Allowance", U.S. Appl. No. 13/362,238, Sep. 18, 2014, 4 pages.

\* cited by examiner

MULTI-FINGER DETECTION AND COMPONENT RESOLUTION

BACKGROUND

Portable computing devices, such as mobile phones, portable and tablet computers, entertainment devices, handheld navigation devices, and the like increasingly offer more functions and features which can make it difficult for a user to navigate and select commands that are relevant to a function the user wants to initiate on a device. In addition to the traditional techniques used to interact with computing devices, such as a mouse, keyboard, and other input devices, touch sensors and touch-screen displays are commonly integrated in mobile phones and tablet computers, and are utilized both for display and user-selectable touch and gesture inputs. A continuing design challenge with these types of portable devices having touch sensors and/or touch-screen displays is the touch signal processing to track touch and gesture inputs that are identified from successive frames of sensor image data.

Touch contacts on a touch-screen display represent the motion trace of a gesture, such as when a user uses his or her fingers to contact a touch-screen display and gesture while maintaining the contact with the display. A failure to correctly track and interpret the motion trace of a touch contact for a gesture input can lead to the failure of gesture recognition operations and gesture tracking processing. For example, multi-finger gesture processing, such as for multi-finger tapping, attempts to detect and resolve when a connected component is associated to multiple fingers that are merged together. Conventional processing techniques use either temporal domain prediction, which depends on finger touch timing and thus can be unreliable, or is based on determining component contour, which is more susceptible to boundary noise in touch input sensor data.

SUMMARY

This Summary introduces simplified concepts of multi-finger detection and component resolution, and the concepts are further described below in the Detailed Description and/or shown in the Figures. This Summary should not be considered to describe essential features of the claimed subject matter, nor used to determine or limit the scope of the claimed subject matter.

Multi-finger detection and component resolution is described. In embodiments, touch input sensor data is recognized as a component of a multi-finger gesture on a touch-screen display. An ellipse is determined that approximately encompasses the component, and the ellipse has a primary axis and a secondary axis that are orthogonal. A distribution is then generated that projects sensor data elements from the primary axis based on detected intensity of the touch input sensor data. A histogram function can then be generated based on the distribution, where the histogram function indicates individual contacts of the component and separation of the individual contacts.

In other embodiments, each individual contact of the component can be associated with a different finger input of the multi-finger gesture. Histogram function high points indicate the individual contacts of the component, and a histogram function low point indicates the separation of the individual contacts of the component. Additionally, a retrace of the histogram function can be performed to confirm the histogram function high points and to eliminate a false indication of an individual contact. The individual contacts of the component can be separated, and an individual ellipse can then be determined for each individual contact to map each of the individual contacts for association with the different finger inputs of the multi-finger gesture.

BRIEF DESCRIPTION OF THE DRAWINGS

Embodiments of multi-finger detection and component resolution are described with reference to the following Figures. The same numbers may be used throughout to reference like features and components that are shown in the Figures.

DETAILED DESCRIPTION

Embodiments of multi-finger detection and component resolution are described. As noted above, touch and gesture inputs on a touch-screen display of a computing device, such as a mobile phone or portable computer, may not be accurately tracked and/or processed. One of the operational stages in multi-touch signal processing is to detect and resolve the multiple contacts in a single connected component. These multiple contacts correspond to multiple fingers when they are close together so that a single connected component is observed. Correctly identifying and resolving these contacts is an important processing aspect of various multi-touch gestures, such as a three-finger tapping gesture versus two- or four-finger tapping. Multi-finger detection and component resolution is implemented as a static approach with single frame dependency to detect multiple fingers that are merged in a single connected component by performing analysis using the data from the current frame only in a statistical framework, and to eliminate the timing dependency, such as in a temporal based solution.

While features and concepts of multi-finger detection and component resolution can be implemented in any number of different devices, systems, environments, and/or configurations, embodiments of multi-finger detection and component resolution are described in the context of the following example devices, systems, and methods.

Figure 1:
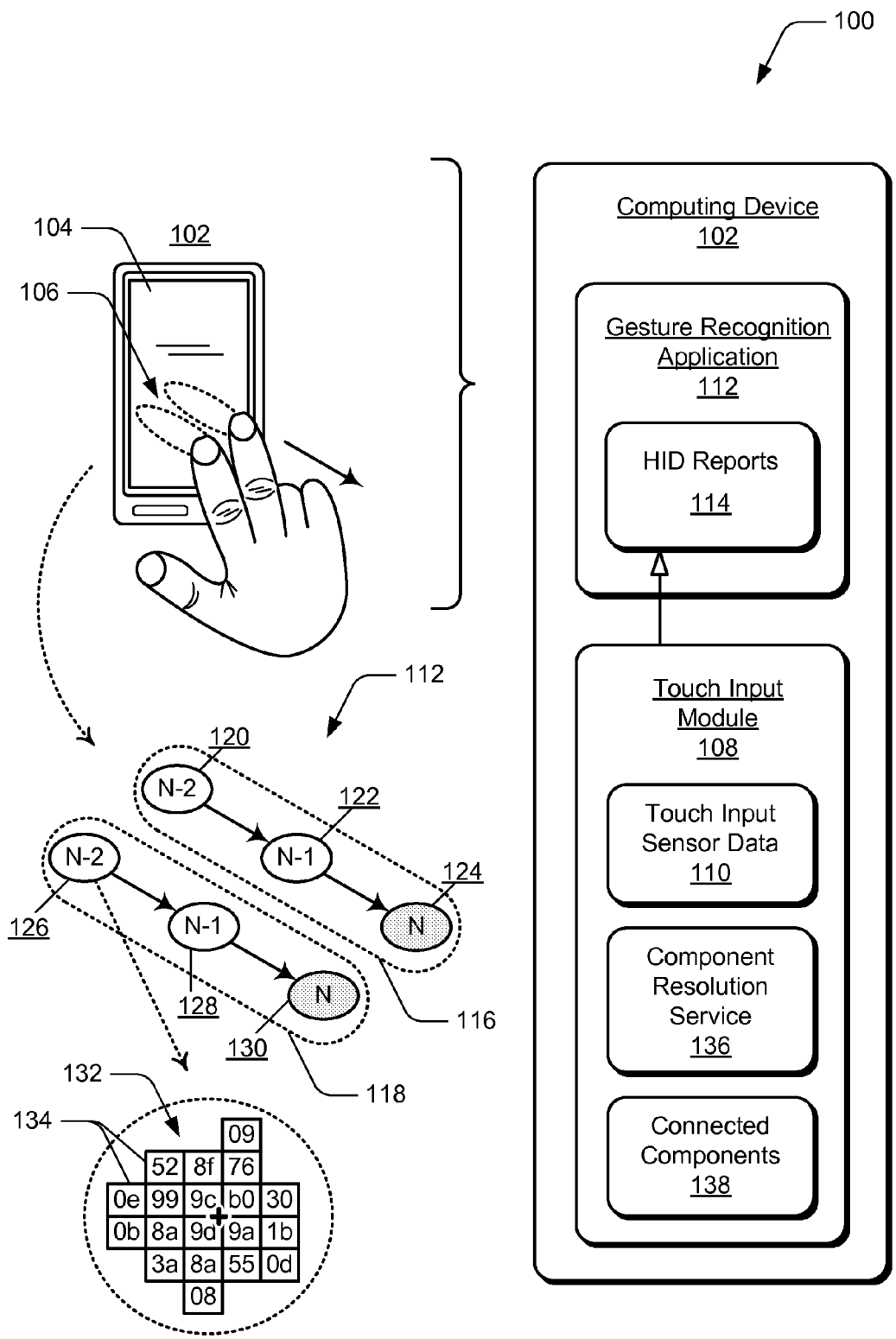
FIG. 1 illustrates an example system in which embodiments of multi-finger detection and component resolution can be implemented.

FIG. 1 illustrates an example system 100 in which various embodiments of multi-finger detection and component resolution can be implemented. The example system includes a computing device 102, which may be any one or combination of a mobile phone, entertainment device, navigation device, user device, wireless device, portable device, tablet computer, dual-screen folding device, and the like. The computing device includes an integrated touch-screen display 104, which is implemented to sense a gesture input 106, such as a user-initiated gesture in a user interface that is displayed on the touch-screen display. In this example, the gesture input is a two finger gesture across the touch-screen display in an approximate direction indicated by the arrow, but may be a single finger gesture input, or a multi-finger gesture input or tap (e.g., three or four finger gesture input tapping). Any of the computing devices can be implemented with various components, such as one or more processors and memory devices, as well as any number and combination of differing components as further described with reference to the example device shown in FIG. 6 to implement embodiments of multi-finger detection and component resolution.

In the example system 100, the computing device 102 includes a touch input module 108 (e.g., a lower layer component) that is implemented to recognize touch input sensor data 110 as a multi-finer gesture input, such as the gesture input 106 on the touch-screen display 104. The computing device also includes a gesture recognition application 112 (e.g., a higher layer component) that receives the touch input sensor data from the touch input module as HID reports 114 (i.e., human interface device reports). The HID reports include a time and position data, as well as determined touch contact tracking, that correlates to gesture inputs on the touch-screen display of the computing device. The gesture recognition application 112 is implemented to recognize and generate various gestures as determined from touch input data (e.g. the HID reports 114) associated with inputs or combinations of inputs, such as the gesture input 106. The gesture recognition application can generate various gestures, such as select gestures, hold gestures, motion gestures, tap gestures, and other types of gestures from various user-selectable inputs.

An input recognition system of the computing device 102 may include any type of input detection features and/or devices to distinguish the various types of inputs, such as sensors (capacitive or resistive), light sensing pixels, touch sensors, cameras, and/or a natural user interface that interprets user interactions, gestures, inputs, and motions. In implementations, the input recognition system can detect motion inputs from discernable variables, such as from a direction variable, from start region position variables and end region position variables, and/or from a motion rate variable (e.g., a particular number of pixels per second).

As described herein, a gesture input may be recognized as a user input with one or more fingers on a touch-screen display of a device, and the gesture input includes one or more contacts that each correlate to the input of a finger on the touch-screen display. In the FIG. 1 example, the two-finger gesture input 106 includes two contacts identified as a first contact 116 that correlates to a first finger of the gesture input, and a second contact 118 that correlates to a second finger of the gesture input.

The gesture input data is received as a series of frames, and a frame includes a component that represents one touch position of a contact (e.g., along a gesture input that is one finger). For a two-finger gesture input, a frame can include a component of a first contact that correlates to the input of a first finger, and include a component of a second contact that correlates to the input of a second finger (and so on for more than a two-finger gesture input).

In the FIG. 1 example, the first contact 116 of the gesture input 106 includes successive components, such as component 120, component 122, and component 124 at different touch positions along the first contact. Similarly, the second contact 118 of the gesture input 112 includes successive components, such as component 126, component 128, and component 130 at different touch positions along the second contact. Accordingly, a first frame of the two-finger gesture input includes the component 120 and the component 126 of the respective first and second contacts at N-2 in the series of components. Similarly, a next frame of the gesture input at N-1 includes the component 122 and the component 128 of the respective first and second contacts, and a current frame of the gesture input at N includes the component 124 and the component 130 of the respective first and second contacts.

Therefore, a contact of a gesture input spans multiple frames and includes the components from each successive frame that have been identified as correlating to the contact, or to a section of the contact. A component represents a touch position of a contact in a frame (e.g., after the component has been identified as correlating to the contact).

The touch input module 108 recognizes the touch input sensor data 110 as the series of components of the two contacts 116 and 118 of the gesture input 106 on the touch-screen display 104 of the computing device 102. In embodiments, the touch input module 108 is implemented to generate a sensor map 132 from the touch input sensor data 110 for each component of each contact. A sensor map represents an individual component of a contact, such as when a user initiates the gesture input 106 on the touch-screen display 104. In this example, the sensor map includes sensor data elements 134 shown as 8-bit hex values that represent the signal strength at an element position in the sensor map. A stronger sensor signal of the touch input sensor data indicates more touch contact with an element in the sensor map. The sensor map can be generated as a two-dimensional array, and array indices of the elements in the two-dimensional grid correlate to sensed touch contact from the gesture input on the touch-screen display. The stationary baseline level can be subtracted out so that the elements in an area around the sensor map that are not detected as part of the touch contact are normalized to a zero level.

The computing device 102 also includes a component resolution service 136 that is implemented for multi-finger detection and resolution of connected components 138. The component resolution service can be implemented as computer-executable instructions, such as a software application, and executed by one or more processors to implement the various embodiments described herein. The component resolution service can also be implemented as firmware on dedicated sensor device hardware in the computing device. In this example, the component resolution service is shown implemented as a component of the touch input module 108. Alternatively, the component resolution service may be implemented as an independent software application or service for multi-finger detection and component resolution.

Figure 2:
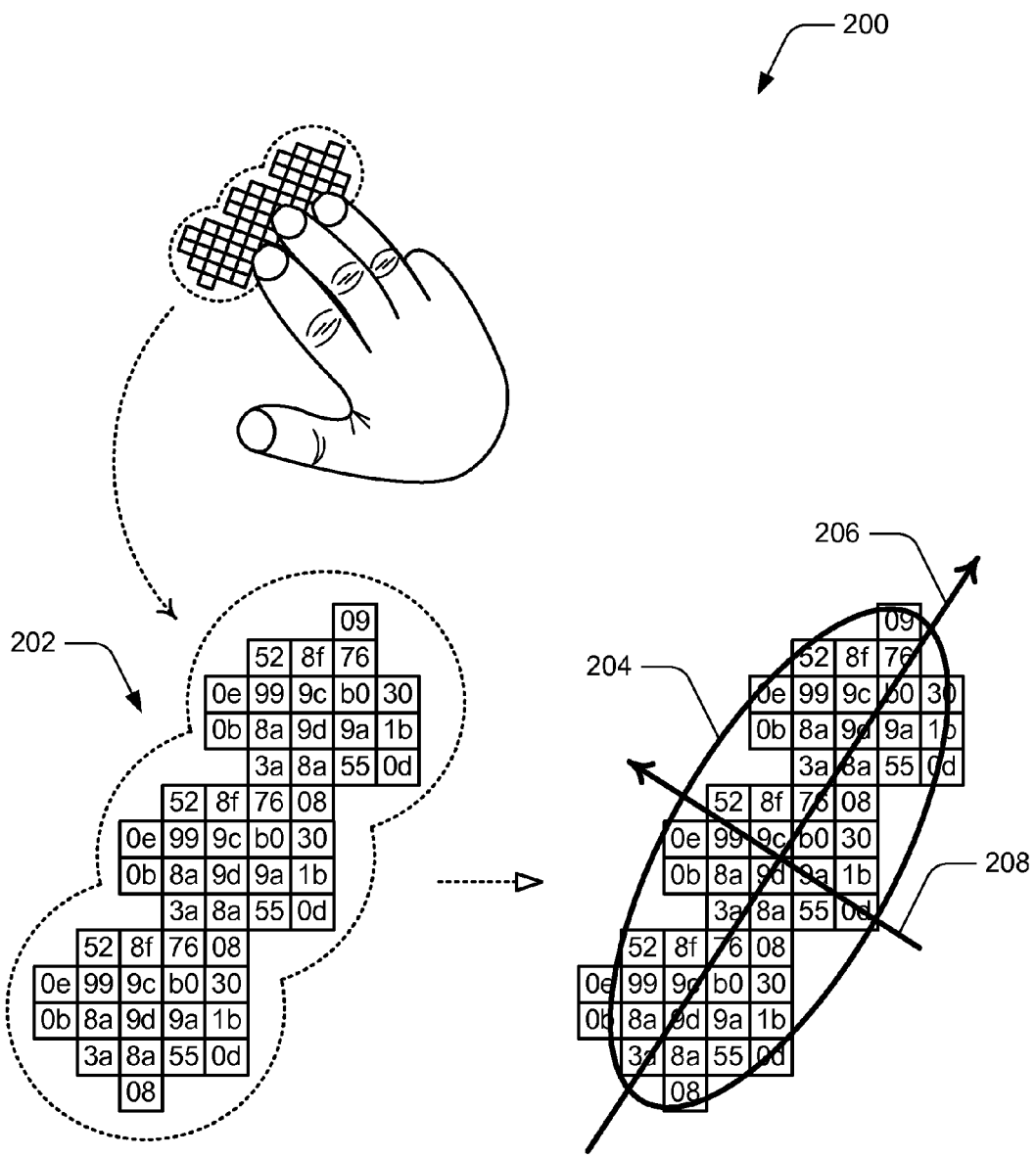
FIG. 2 illustrates an example multi-finger gesture and a connected component in accordance with one or more embodiments.

FIG. 2 illustrates an example multi-finger gesture 200, such as a tapping gesture with three fingers. Embodiments of multi-finger detection and component resolution can be implemented by the electronic device 102 and the various components described with reference to FIG. 1. For example, the touch input module 108 recognizes touch input sensor data as a component 202 of the multi-finger gesture on the touch-screen display of the device. In this example, the component 202 is represented as a sensor map, which is generated as a two-dimensional array of sensor data elements that correlate to the detected intensity of the multi-finger gesture on the touch-screen display. In an embodiment, the component resolution service 136 is implemented determine an ellipse 204 that approximately encompasses the component 202, and the ellipse has a primary axis 206 and a secondary axis 208 that are orthogonal.

The detection of the multi-finger condition can be based on the mixture Gaussian model to model the multiple contacts and uses the standard Expectancy-Maximum (EM) procedure to obtain the centroids of individual contacts in the component. In an embodiment, the component resolution service 136 in the first stage can model the sensor map as a Gaussian distribution, and the ellipse 204 that approximately encompasses the component 202 is determined from the Gaussian distribution.

The component 202 can be modeled as a Gaussian distribution and then a Maximum Likelihood Estimation (MLE) performed on the connected component to estimate the two axis of the ellipse for the component shape. The center-of-mass and covariance matrix can be determined as in the following equations (1), (2), and (3):

$$\hat{\mu} = \frac{1}{N} \sum_{y=0}^{H-1} \sum_{x=0}^{W-1} s[x][y] x \tag{1}$$

$$\hat{\Sigma} = \frac{1}{N} \sum_{y=0}^{H-1} \sum_{x=0}^{W-1} s[x][y] (x-\hat{\mu})(x-\hat{\mu})^T \tag{2}$$

$$N = \sum_{y=0}^{H-1} \sum_{x=0}^{W-1} s[x][y] \tag{3}$$

The value of s[x][y] is the element value treated as a histogram of all the samples at a particular grid position (x,y). The Eigen problem to the 2×2 matrix is solved in the equation (4):

$$\hat{\Sigma} \phi = \Lambda \phi \tag{4}$$

The parameter $\Lambda = \text{diag}(\lambda 0, \lambda 1)$ is the 2×2 diagonal matrix of Eigen values, and the parameter $\phi = (\phi_0 \phi_1)$ is the Eigen vector matrix of columns that correspond to $\lambda 0$ and $\lambda 1$. For this 2×2 Eigen problem, there exists an exact solution, and the two Eigen values can be determined by solving the following quadratic equation (5):

$$\lambda^2 - Tr(\hat{\Sigma})\lambda + |\hat{\Sigma}| = 0 \tag{5}$$

The primary axis 206 is direction of the Eigen vector $\phi_0$ that corresponds to the larger Eigen value $\lambda 0$, and the secondary axis 208 is defined by the other Eigen vector $\phi_1$.

Figure 3:
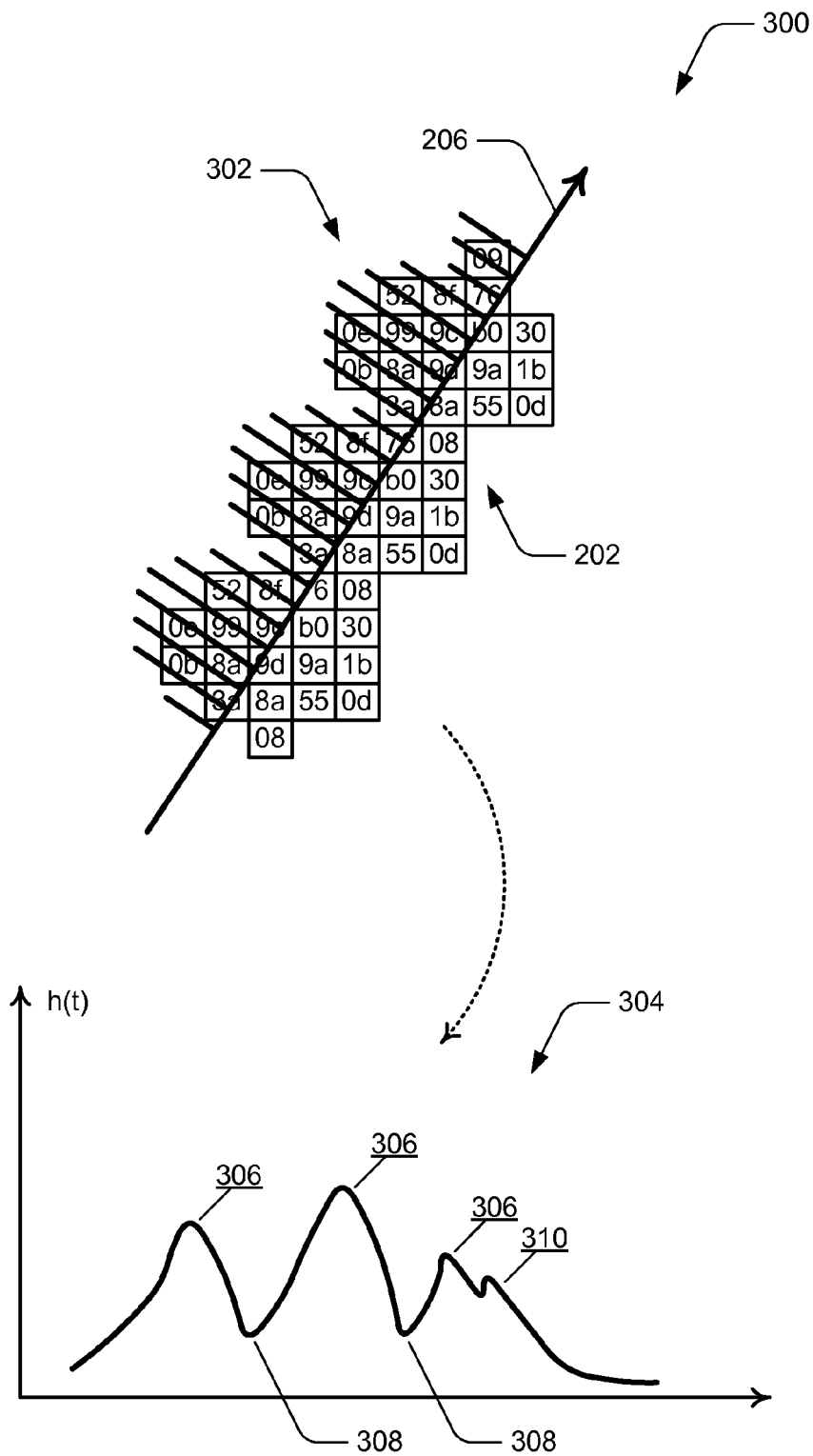
FIG. 3 illustrates examples of a distribution and a histogram function based on the component for the multi-finger gesture in accordance with one or more embodiments.

FIG. 3 illustrates examples 300 of a distribution and a histogram function based on the component 202 for the multi-finger gesture 200 described with reference to FIG. 2. In embodiments, the component resolution service 136 in the second stage is implemented to generate a distribution 302 that projects sensor data elements to the primary axis 206 of the ellipse 204 based on detected intensity of the touch input sensor data. The dimensional reduction projects the sensor data elements onto the primary axis in a weighted fashion, which emphasizes the off-axis contribution along with the sensor data element value.

The component resolution service 136 is also implemented to generate a histogram function 304 based on the distribution 302. In this example, the histogram function indicates individual contacts of the component and separation of the individual contacts. For example, histogram function high points 306 (also referred to as "peaks" in the graph) indicate the individual contacts of the connected component 202. Additionally, histogram function low points 308 (also referred to as "valleys" in the graph) indicate the separation of the individual contacts of the component.

The dimensional reduction of the sensor data elements to the primary axis 206 can be performed by projecting each sensor data element of the component 202 to the primary axis.

The histogram function h(t) can be generated for each given integer $t = \text{int}(x_{\parallel})$ where $x_{\parallel}$ and $x_{\perp}$ are defined as in the following equations (6) and (7):

$$x_{\parallel} = (x - \hat{\mu}) \cdot \phi_0 \tag{6}$$

$$x_{\perp} = (x - \hat{\mu}) \cdot \phi_1 \tag{7}$$

Therefore, $x_{\parallel}$ represents the element location (relative to the centroid) projected along the primary axis, and $x_{\perp}$ is the projection along the normal direction (e.g., the secondary axis). Implementing a good histogram function h(t) can be used to discriminate the high points 306 in the histogram function h(t), while minimizing false detection. One example of such function h(t) can be obtained by first defining the following three functions $f(t)$, n(t), and m(t) as shown in the following equations (8), (9), and (10):

$$f(t) = \Sigma_x(p[x][y] + \alpha |x_{\perp}|) \cdot \delta(t - \text{int}(x_{\parallel})) \tag{8}$$

$$n(t) = \Sigma_x \delta(t - \text{int}(x_{\parallel})) \tag{9}$$

$$m(t) = \max_x(p[x][y] \cdot \delta(t - \text{int}(x_{\parallel}))) \tag{10}$$

The final histogram function h(t) can be obtained by the equation (11):

$$h(t) = \frac{f(t) * m(t)}{n(t)} \tag{11}$$

Here $\alpha$ (set to sixty-four (64) in an implementation) is the mixing constant between sensor unit and the displacement unit; and $\delta(t - \text{int}(x_{\parallel}))$ imposes a constraint in the domain of summation or maximum to pick out the elements having a projection to the primary axis that equals t. In these three functions, the function $f(t)$ represents the general shape of the histogram function high points at a finger touch. The function n(t) is the normalization function which neutralizes the contribution from a different number of elements for a value t and the neighbor value (t−1 or t+1), in order to offset the noise impact on the boundaries for a given t. The function m(t) is a weighting function which reduces the contribution from a particular value of t that has smaller peak value, which may be seen when two fingers of a gesture input stick together.

In embodiments, the component resolution service 136 is further implemented to perform a retrace of the histogram function to confirm the histogram function high points and to eliminate a false indication 310 of an individual contact. In the histogram function 304, the individual contacts can be located by tracking the local max and local min values of h(t) as t moves across the range of the entire component. A high point, or peak, of h(t) can be confirmed after a sufficient pull-back from a last local maximum. Likewise, a low point, or valley, of h(t) can be confirmed after a sufficient pull-up from a last local minimum. In an implementation, the condition for being sufficient is defined with a percentage of retrace in the opposite direction, such as 50% or more, which suffices to prevent a noise-induced, false confirmation of an individual contact in the histogram function h(t).

As is apparent in the illustration, the histogram function high points 306 (also referred to as peaks or local max) and the histogram function low points 308 (also referred to as valleys or local min) are laid out relative to the primary axis 206 in an interleave fashion. Each of the histogram function high points 306 can be associated with a particular finger input, and each of the histogram function low points 308 indicate the separation of the individual contacts in the component. In an implementation, and for convenience of computation, the individual contacts can be processed as rectangular shapes, which may or may not fit well with the actual shape of the different finger inputs of the multi-finger gesture. We can then use them as initial seeds to feed into an EM procedure for additional iterations in the mixture Gaussian model, where typically one additional iteration can produce a better result. In the event that detection along the primary axis results in a single histogram function high point (e.g., a single peak in the histogram function), the same operation can be repeated on the secondary axis 208 of the ellipse 204, which may confirm a single touch only when both directions render a single peak.

Figure 4:
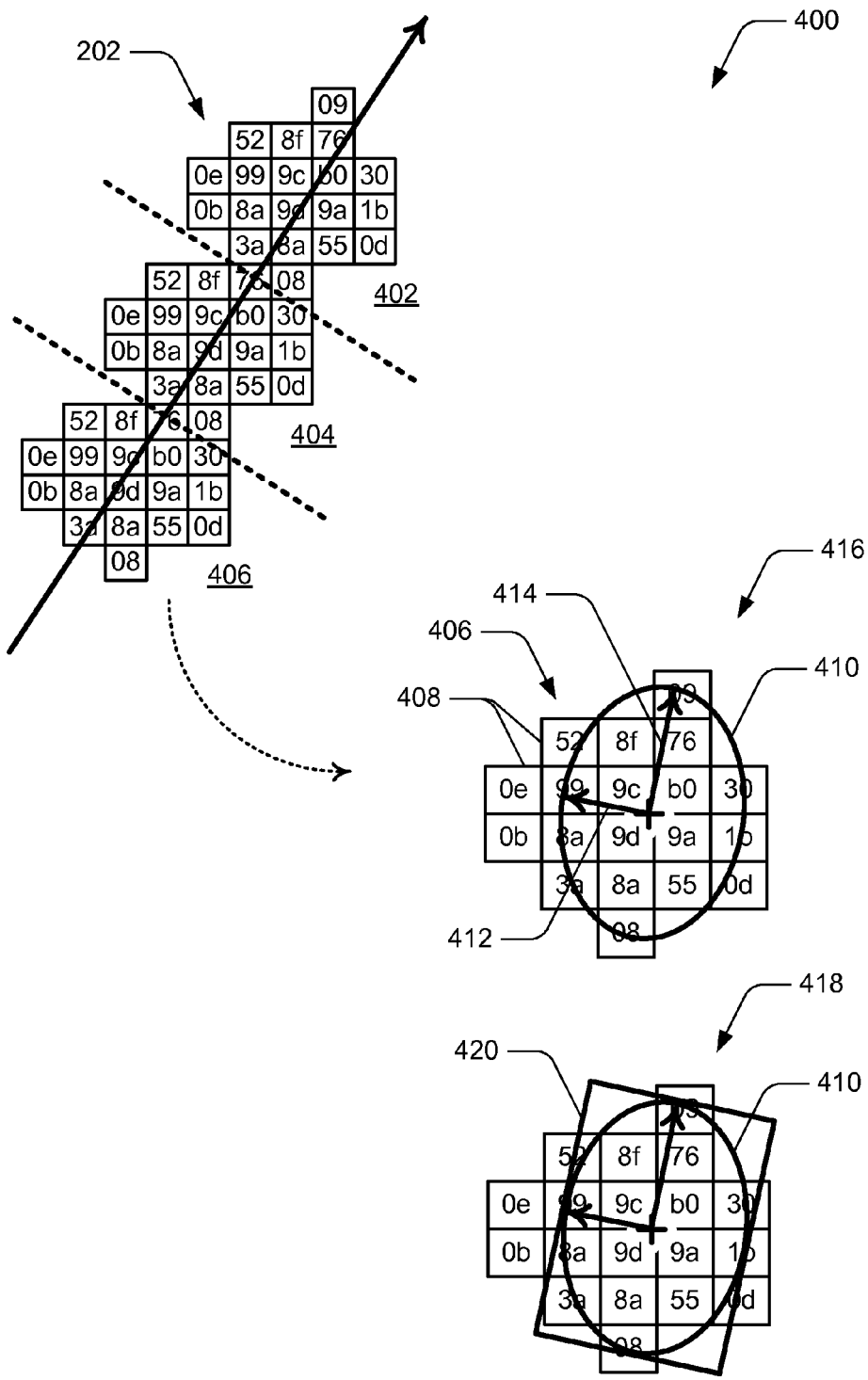
FIG. 4 illustrates an example of separating individual contacts of the component of the multi-finger gesture in accordance with one or more embodiments.

FIG. 4 illustrates an example 400 of separating the individual contacts of the component 202 of the multi-finger gesture 200 described with reference to FIG. 2, and based on the histogram function that is generated as described with reference to FIG. 3. In embodiments, the component resolution service 136 is implemented to separate the individual contacts 402, 404, and 406 of the component 202 and associate each touch input with a different finger input of the multi-finger gesture. The component resolution service 136 is also implemented to again perform the Gaussian fitting distribution via Maximum Likelihood Estimation (MLE) for each individual touch input to determine the centroid and covariance matrix of each contact in the component.

The component resolution service 136 is implemented to model the sensor map that correlates to an individual touch input as a Gaussian distribution, with a probabilistic distribution function as in equation (12):

$$p(x) = \frac{1}{2\pi\sqrt{|\Sigma|}} \exp\left(-\frac{1}{2}(x-\mu)^T \Sigma^{-1}(x-\mu)\right) \quad (12)$$

The variable $x=(x,y)$ is an index vector into the two-dimensional sensor map. The parameter $\mu$ is the mean, and the parameter $\Sigma$ is a 2×2 matrix of the covariance matrix. The parameters $\mu$ and $\Sigma$ can be determined so that the probability density function (Gaussian PDF) best fits the sensor map s[x][y] that represents the contact shape of the touch input. To do so, the component resolution service is implemented to perform the MLE to derive the following equations (13) and (14):

$$\hat{\mu} = \frac{1}{N} \sum_{i=0}^{N-1} x_i \quad (13)$$

$$\hat{\Sigma} = \frac{1}{N} \sum_{i=0}^{N-1} (x_i - \hat{\mu})(x_i - \hat{\mu})^T \quad (14)$$

The parameter N is the total number of sample points when performing the MLE. In this implementation, the value of s[x][y] is treated as a histogram of all the samples at a particular index point (x,y). As such, the parameter N can be derived as in the following equation (15):

$$N = \Sigma_{y=0}^{H-1} \Sigma_{x=0}^{W-1} s[x][y] \quad (15)$$

The equations (13) and (14) can be rewritten in terms of a weighted sum with s[x][y] as the weight, as in the following equations (16) and (17):

$$\hat{\mu} = \frac{1}{N} \sum_{y=0}^{H-1} \sum_{x=0}^{W-1} s[x][y]x \quad (16)$$

$$\hat{\Sigma} = \frac{1}{N} \sum_{y=0}^{H-1} \sum_{x=0}^{W-1} s[x][y](x-\hat{\mu})(x-\hat{\mu})^T \quad (17)$$

Although the summations are now over the entire two-dimensional grid, the summation can be processed and determined quickly since s[x][y] of the sensor map is non-zero only near the touch input. Note that the parameter $\hat{\mu}$ is the center of mass of the touch input, and the covariance matrix $\hat{\Sigma}$ designates the constant-level contours of the Gaussian distribution, which is the shape of an ellipse. In embodiments, the ellipse represents the contact shape of the touch input. Generally, the contact shape of the touch input is irregular in shape, and the component resolution service is implemented to determine the ellipse of a size and rotation angle that approximately encompasses the elements 408 of the sensor map. The component resolution service determines the ellipse 410 (also referred to as the "best-fit ellipse") from the Gaussian distribution.

In embodiments, the component resolution service 136 is implemented to determine the ellipse shape from the covariance matrix $\hat{\Sigma}$, recognizing that the two main axis (e.g., minor axis 412 and major axis 414) of the ellipse correspond to the two Eigenvectors of $\hat{\Sigma}$ that each have a length proportional to the square root of the corresponding Eigen values. Accordingly, the following Eigen problem is solved as in equation (18):

$$\hat{\Sigma}\phi = \Lambda\phi \quad (18)$$

The parameter $\Lambda = \mathrm{diag}(\lambda 0, \lambda 1)$ is the 2×2 diagonal matrix of Eigen values, and the parameter $\phi$ is the Eigen vector matrix of columns that correspond to $\lambda 0$ and $\lambda 1$. For this 2×2 Eigen problem, there exists an exact solution, and the two Eigen values can be determined by solving the following quadratic equation (19):

$$\lambda^2 - Tr(\hat{\Sigma})\lambda + |\hat{\Sigma}| = 0 \quad (19)$$

As shown at 416, the ellipse 410 that corresponds to the contact shape of the touch input is defined by the two axis vectors 412 and 414 that are determined by scaling the two Eigen vectors by the squared root of the corresponding Eigen values $\Lambda^{1/2}\phi$. The Eigen values $\Lambda^{1/2}\phi$ can be globally scaled so that the resulting angular contact geometry fits the actual contact shape of the touch input, and an appropriate constant-level contour is selected for the shape matching. In practice, a scaling factor $\alpha$ can also be selected so that the area of the scaled ellipse numerically matches to the actual contact shape of the touch input from s[x][y] of the sensor map. As shown at 418, the ellipse 410 can also be represented as a rectangle 420 that bounds the ellipse, where the rectangle is defined by a height, a width, and a rotation angle.

Example method 500 is described with reference to FIG. 5 in accordance with one or more embodiments of multi-finger detection and component resolution. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
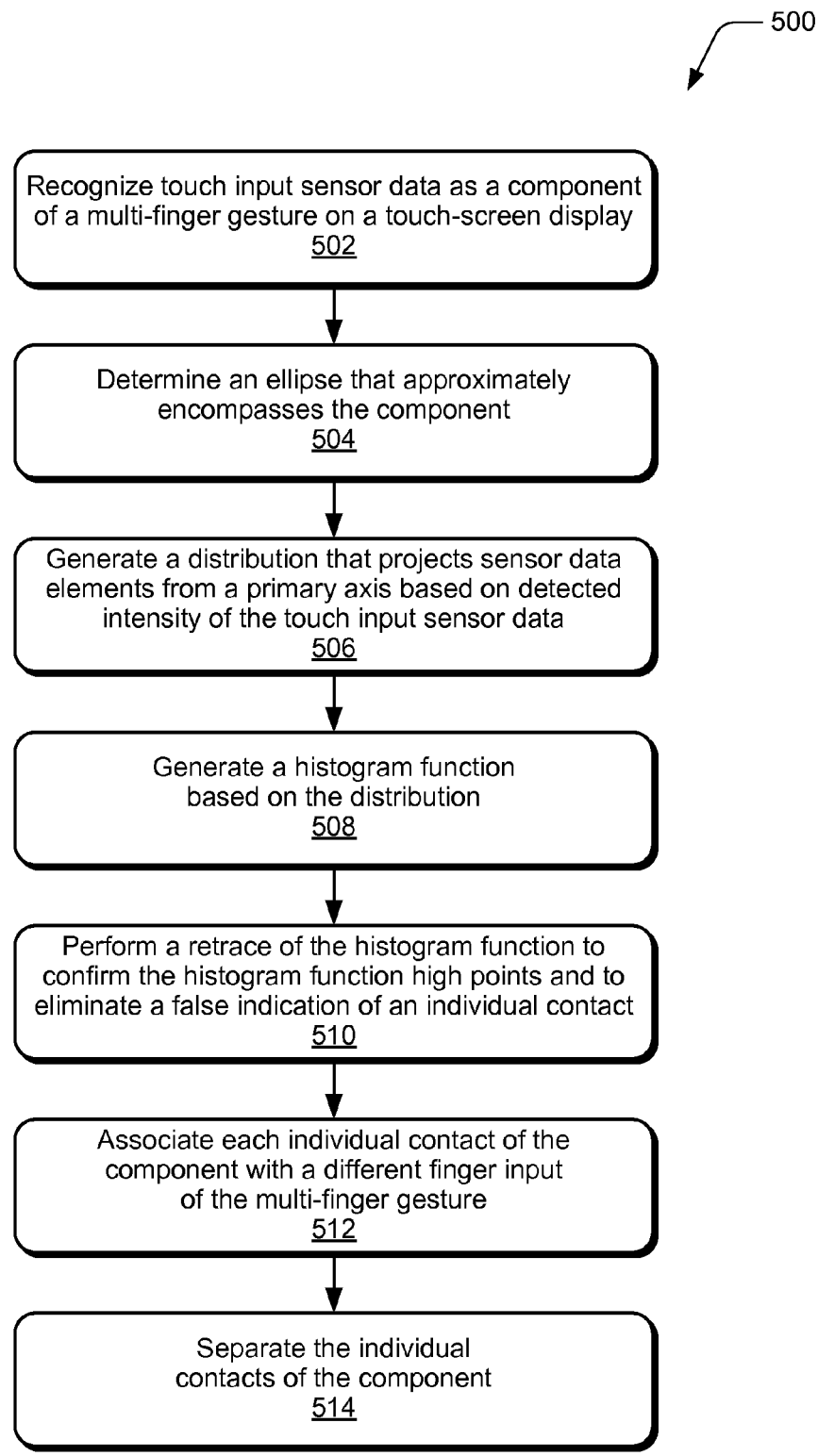
FIG. 5 illustrates example method(s) of multi-finger detection and component resolution in accordance with one or more embodiments.

FIG. 5 illustrates example method(s) 500 of multi-finger detection and component resolution. The order in which the method blocks are described are not intended to be construed as a limitation, and any number of the described method blocks can be combined in any order to implement a method, or an alternate method.

At block 502, touch input sensor data is recognized as a component of a multi-finger gesture on a touch-screen display. For example, the touch input module 108 at the computing device 102 (FIG. 1) recognizes the touch input sensor data 110 as a component 202 of the multi-finger gesture 200 (FIG. 2) on a touch-screen display. In embodiments the component can be represented as a sensor map, which is generated as a two-dimensional array of the sensor data elements that correlate to the detected intensity of the multi-finger gesture on the touch-screen display. A stronger sensor signal of the touch input sensor data indicates more contact with a sensor data element in the sensor map. The sensor map can be modeled as a Gaussian distribution, and an ellipse that approximately encompasses the component can be determined from the Gaussian distribution.

At block 504, an ellipse is determined that approximately encompasses the component. For example, the component resolution service 136 at the computing device 102 determines the ellipse 204 that approximately encompasses the component 202, and the ellipse has a primary axis 206 and a secondary axis 208 that are orthogonal. At block 506, a distribution is generated that projects sensor data elements from the primary axis based on detected intensity of the touch input sensor data. For example, the component resolution service 136 generates the distribution 302 (FIG. 3) that projects sensor data elements to the primary axis 206 of the ellipse 204 based on detected intensity of the touch input sensor data. The dimensional reduction projects the sensor data elements onto the primary axis in a weighted fashion, which emphasizes the off-axis contribution along with the sensor data element value.

At block 508, a histogram function is generated based on the distribution. For example, the component resolution service 136 generates the histogram function 304 based on the distribution 302. The histogram function indicates individual contacts of the component and separation of the individual contacts. For example, histogram function high points 306 (also referred to as "peaks" in the graph) indicate the individual contacts of the connected component 202. Additionally, histogram function low points 308 (also referred to as "valleys" in the graph) indicate the separation of the individual contacts of the component.

At block 510, a retrace of the histogram function is performed to confirm the histogram function high points and to eliminate a false indication of an individual contact. For example, the component resolution service 136 performs a retrace of the histogram function to confirm the histogram function high points and to eliminate a false indication 310 of an individual contact. At block 512, each individual contact of the component is associated with a different finger input of the multi-finger gesture and, at block 514, the individual contacts of the component are separated. For example, the component resolution service 136 separates the individual contacts 402, 404, and 406 (FIG. 4) of the component 202 and associates each touch input with a different finger input of the multi-finger gesture 200. An individual ellipse can then be determined for each individual touch input to map each of the individual contacts for association with the different finger inputs of the multi-finger gesture.

Figure 6:
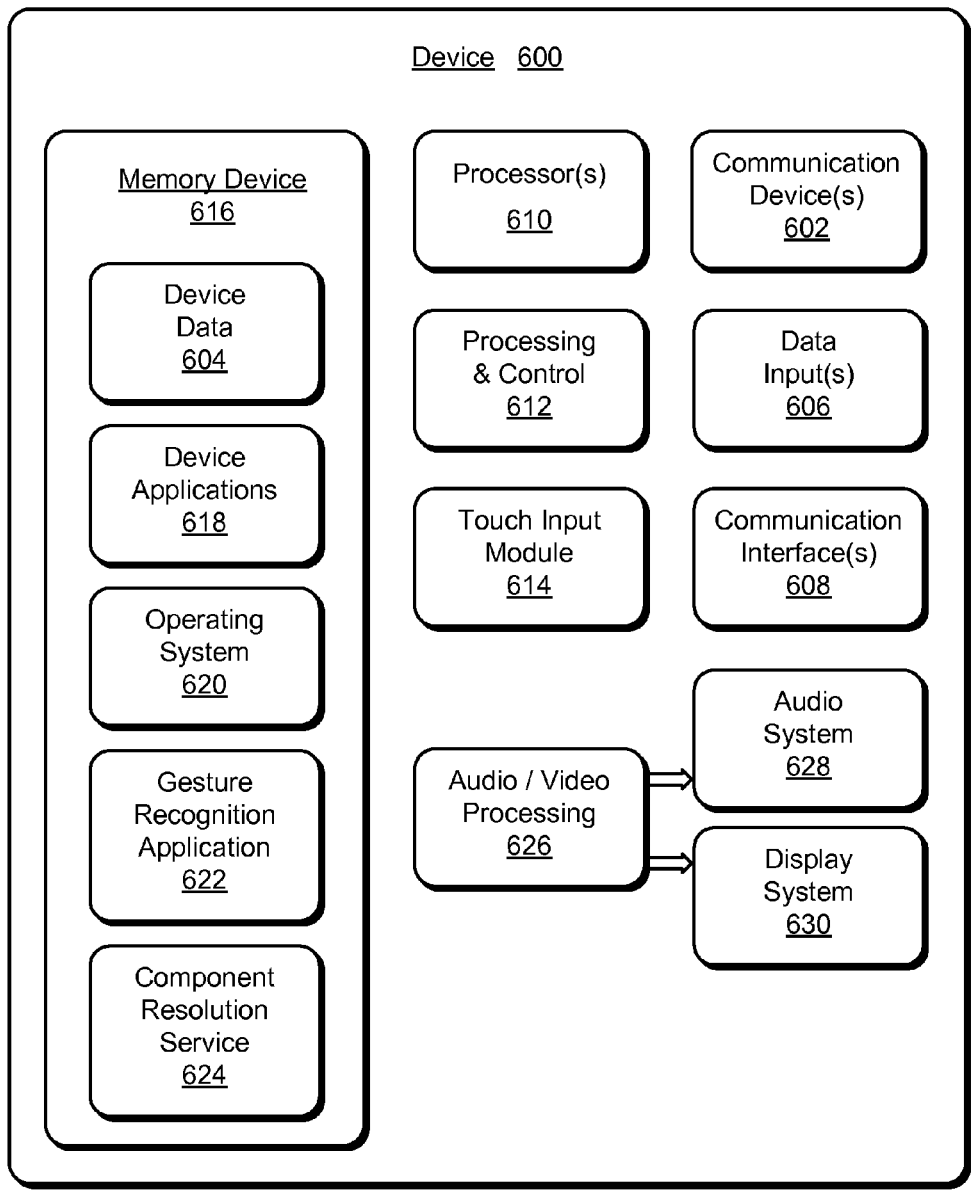
FIG. 6 illustrates various components of an example device that can implement embodiments of multi-finger detection and component resolution.

FIG. 6 illustrates various components of an example device 600 that can be implemented as any of the devices, or services implemented by devices, described with reference to the previous FIGS. 1-5. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device.

The device 600 includes one or more processors 610 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 612. In embodiments, the device 600 can also include a touch input module 614 that is implemented to recognize touch input sensor data. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 616 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 616 provides data storage mechanisms to store the device data 604, other types of information and/or data, and various device applications 618. For example, an operating system 620 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 618 include a gesture recognition application 622 and a component resolution service 624 that implement embodiments of multi-finger detection and component resolution as described herein.

The device 600 also includes an audio and/or video processing system 626 that generates audio data for an audio system 628 and/or generates display data for a display system 630. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of multi-finger detection and component resolution have been described in language specific to features and/or methods, the appended claims are not necessarily limited to the specific features or methods described. Rather, the specific features and methods are disclosed as example implementations of multi-finger detection and component resolution.

The invention claimed is:

1. A method, comprising:
recognizing touch input sensor data as a component of a multi-finger gesture on a touch-screen display;
determining an ellipse that approximately encompasses the component, the ellipse having a primary axis and a secondary axis that are orthogonal;
generating a distribution that projects sensor data elements from the primary axis based on detected intensity of the touch input sensor data; and
generating a histogram function based on the distribution, using a ratio of a weighting function which reduces contribution from a location with a peak value and a normalization function which neutralizes contribution from a neighbor location, the ratio being the weighting function which reduces contribution from a location with a peak value divided by the normalization function which neutralizes contribution from a neighbor location, the histogram function indicating individual contacts of the component and separation of the individual contacts.

2. A method as recited in claim 1, further comprising associating each individual contact of the component with a different finger input of the multi-finger gesture.

3. A method as recited in claim 1, wherein histogram function high points indicate the individual contacts of the component, and a histogram function low point indicates the separation of the individual contacts of the component.

4. A method as recited in claim 3, further comprising performing a retrace of the histogram function to confirm the histogram function high points and to eliminate a false indication of an individual contact.

5. A method as recited in claim 1, wherein:
the component is represented as a sensor map, which is generated as a two dimensional array of the sensor data elements that correlate to the detected intensity of the multi-finger gesture on the touch-screen display; and
a stronger sensor signal of the touch input sensor data indicates more contact with a sensor data element in the sensor map.

6. A method as recited in claim 5, further comprising modeling the sensor map as a Gaussian distribution, and wherein the ellipse that approximately encompasses the component is determined from the Gaussian distribution.

7. A method as recited in claim 1, further comprising:
separating the individual contacts of the component; and
determining an individual ellipse for each individual contact to map each of the individual contacts for association with the different finger inputs of the multi-finger gesture.

8. A computing device, comprising:
a touch-screen display;
a touch input module configured to recognize touch input sensor data as a component of a multi-finger gesture on the touch-screen display;
at least a memory and a processor to implement a component resolution service configured to:
determine an ellipse that approximately encompasses the component, the ellipse having a primary axis and a secondary axis that are orthogonal;
generate a distribution that projects sensor data elements from the primary axis based on detected intensity of the touch input sensor data; and
generate a histogram function based on the distribution, using a ratio of a weighting function which reduces contribution from a location with a peak value and a normalization function which neutralizes contribution from a neighbor location, the ratio being the weighting function which reduces contribution from a location with a peak value divided by the normalization function which neutralizes contribution from a neighbor location, the histogram function indicating individual contacts of the component and separation of the individual contacts.

9. A computing device as recited in claim 8, wherein the component resolution service is further configured to associate each individual contact of the component with a different finger input of the multi-finger gesture.

10. A computing device as recited in claim 8, wherein histogram function high points indicate the individual contacts of the component, and a histogram function low point indicates the separation of the individual contacts of the component.

11. A computing device as recited in claim 10, wherein the component resolution service is further configured to perform a retrace of the histogram function to confirm the histogram function high points and to eliminate a false indication of an individual contact.

12. A computing device as recited in claim 8, wherein:
the component is represented as a sensor map, which is generated as a two dimensional array of the sensor data elements that correlate to the detected intensity of the multi-finger gesture on the touch-screen display; and
a stronger sensor signal of the touch input sensor data indicates more contact with a sensor data element in the sensor map.

13. A computing device as recited in claim 12, wherein the component resolution service is further configured to model the sensor map as a Gaussian distribution, and wherein the ellipse that approximately encompasses the component is determined from the Gaussian distribution.

14. A computing device as recited in claim 8, wherein the component resolution service is further configured to:
separate the individual contacts of the component; and
determine an individual ellipse for each individual contact to map each of the individual contacts for association with the different finger inputs of the multi-finger gesture.

15. One or more computer-readable storage media devices comprising instructions that are executable and, responsive to executing the instructions, a computing device:
recognizes touch input sensor data as a component of a multi-finger gesture on a touch-screen display;
determines an ellipse that approximately encompasses the component, the ellipse having a primary axis and a secondary axis that are orthogonal;
generates a distribution that projects sensor data elements from the primary axis based on detected intensity of the touch input sensor data; and
generates a histogram function based on the distribution, using a ratio of a weighting function which reduces contribution from a location with a peak value and a normalization function which neutralizes contribution from a neighbor location, the ratio being the weighting function which reduces contribution from a location with a peak value divided by the normalization function which neutralizes contribution from a neighbor location, the histogram function indicating individual contacts of the component and separation of the individual contacts.

16. One or more computer-readable storage media devices as recited in claim 15, further comprising additional instructions that are executable and, responsive to executing the additional instructions, the computing device associates each individual contact of the component with a different finger input of the multi finger gesture.

17. One or more computer-readable storage media devices as recited in claim 15, further comprising additional instructions that are executable and, responsive to executing the additional instructions, the computing device generates the histogram function to include high points that indicate the individual contacts of the component, and to include histogram function low points that indicate the separation of the individual contacts of the component.

18. One or more computer-readable storage media devices as recited in claim 17, further comprising additional instructions that are executable and, responsive to executing the additional instructions, the computing device performs a retrace of the histogram function to confirm the histogram function high points and to eliminate a false indication of an individual contact.

19. One or more computer-readable storage media devices as recited in claim 15, further comprising additional instructions that are executable and, responsive to executing the additional instructions, the computing device:
separates the individual contacts of the component; and
determines an individual ellipse for each individual contact to map each of the individual contacts for association with the different finger inputs of the multi-finger gesture.

20. One or more computer-readable storage media devices as recited in claim 15, further comprising additional instructions that are executable and, responsive to executing the additional instructions, the computing device models a sensor map as a Gaussian distribution, wherein:
the ellipse that approximately encompasses the component is determined from the Gaussian distribution;
the component is represented as the sensor map, which is generated as a two dimensional array of the sensor data elements that correlate to the detected intensity of the multi-finger gesture on the touch-screen display; and
a stronger sensor signal of the touch input sensor data indicates more contact with a sensor data element in the sensor map.

* * * * *